US012057978B2

(12) United States Patent
Selvaganapathy et al.

(10) Patent No.: US 12,057,978 B2
(45) Date of Patent: Aug. 6, 2024

(54) ENHANCEMENTS TO SUB-BWP OPERATION

(71) Applicant: Nokia Technologies Oy, Espoo (FI)

(72) Inventors: Srinivasan Selvaganapathy, Bangalore (IN); Kari Pekka Pajukoski, Jr., Oulu (FI); Esa Tapani Tiirola, Oulu (FI); Nitin Mangalvedhe, Hoffman Estates, IL (US); Rapeepat Ratasuk, Inverness, IL (US)

(73) Assignee: Nokia Technologies Oy, Espoo (FI)

( * ) Notice: Subject to any disclaimer, the term of this patent is extended or adjusted under 35 U.S.C. 154(b) by 341 days.

(21) Appl. No.: 17/433,405

(22) PCT Filed: Feb. 21, 2020

(86) PCT No.: PCT/EP2020/054615
§ 371 (c)(1),
(2) Date: Aug. 24, 2021

(87) PCT Pub. No.: WO2020/173827
PCT Pub. Date: Sep. 3, 2020

(65) Prior Publication Data
US 2022/0158793 A1 May 19, 2022

(30) Foreign Application Priority Data
Feb. 25, 2019 (IN) .............................. 201941007196

(51) Int. Cl.
*H04L 27/26* (2006.01)
*H04L 5/00* (2006.01)
(Continued)

(52) U.S. Cl.
CPC ........ *H04L 27/2602* (2013.01); *H04L 5/0048* (2013.01); *H04L 5/0051* (2013.01); *H04W 56/001* (2013.01); *H04W 72/23* (2023.01)

(58) Field of Classification Search
CPC ............... H04L 27/2602; H04L 5/0048; H04L 5/0051; H04L 5/0007; H04L 5/0053; H04W 56/001; H04W 72/23
See application file for complete search history.

(56) References Cited

U.S. PATENT DOCUMENTS

2020/0136878 A1* 4/2020 Yi ..................... H04W 72/0453
2021/0336758 A1* 10/2021 Song .................... H04L 5/1469

FOREIGN PATENT DOCUMENTS

WO   WO 2018/085145 A1   5/2018
WO   WO 2019/013564 A1   1/2019
(Continued)

OTHER PUBLICATIONS

3GPP TSG RAN WG1 Meeting 90bis, Prague, CZ, Oct. 9-13, 2017, R1-1718901, MediaTek Inc., "Summary of Bandwidth Part Operation", 14 pgs.
(Continued)

*Primary Examiner* — Dady Chery
(74) *Attorney, Agent, or Firm* — Barta Jones, PLLC

(57) ABSTRACT

A method and apparatus to perform receiving at least one control signal in one of subframes or symbols of a sub-bandwidth part of signaling from a network node of a communication network; based on the at least one control signal of the sub-bandwidth part, performing timing and frequency synchronization for the communication network; and using the synchronized timing and frequency, maintain a connected state for communication operations with the communication network. Further, to perform configuring signaling including at least one control signal in one of subframes or symbols of a sub-bandwidth part of the signaling configured for a device, wherein the sub-bandwidth part of the signaling is configured for the device; and sending towards the device the signaling including the at (Continued)

least one control signal in the one of subframes or symbols of the sub-bandwidth part.

27 Claims, 6 Drawing Sheets

(51) Int. Cl.
*H04W 56/00* (2009.01)
*H04W 72/23* (2023.01)

(56) References Cited

FOREIGN PATENT DOCUMENTS

| WO | WO 2019/022473 A1 | 1/2019 |
| WO | WO 2019/032844 A1 | 2/2019 |
| WO | WO-2019/033017 A1 | 2/2019 |
| WO | 2020/094348 A1 | 5/2020 |

OTHER PUBLICATIONS

"Outcome on 5G Nr", RAN1 #105-e, Nokia, May 19-27, 2021, pp. 1-324.
"New SID on support of reduced capability NR devices", 3GPP TSG RAN Meeting #86, RP-193238, Agenda: 9.1.1, Ericsson, Dec. 9-12, 2019, 5 pages.
"3rd Generation Partnership Project; Technical Specification Group Radio Access Network; Evolved Universal Terrestrial Radio Access (E-UTRA); Multiplexing and channel coding (Release 8)", 3GPP TS 36.212, V8.6.0, Mar. 2009, pp. 1-59.
"IEEE 802.11ah", Wikipedia, Retrieved on Apr. 4, 2024, Webpage available at: https://en.wikipedia.org/wiki/IEEE_802.11ah.
"IEEE 802.15.4", Wikipedia, Retrieved on Apr. 4, 2024, Webpage available at: https://en.wikipedia.org/wiki/IEEE_802. 15.4.
International Search Report and Written Opinion received for corresponding Patent Cooperation Treaty Application No. PCT/EP2020/054615, dated May 18, 2020, 12 pages.

\* cited by examiner

AVAILABLE OFDM NUMEROLOGIES FOR 5G NEW RADIO, NORMAL CP LENGTH (NR)

| SUBCARRIER SPACING [kHz] | 15 | 30 | 60 | 120 | 240 |
|---|---|---|---|---|---|
| SYMBOL DURATION [US] | 66.7 | 33.3 | 16.7 | 8.33 | 4.17 |
| NOMINAL NORMAL CP [US] | 4.7 | 2.3 | 1.2 | 0.59 | 0.29 |
| MIN SCHEDULING INTERVAL (SYMBOLS) | 14 | 14 | 14 | 14 | 28 |
| MIN SCHEDULING INTERVAL (SLOTS) | 1 | 1 | 1 | 1 | 2 |
| MIN SCHEDULING INTERVAL (MS) | 1 | 0.5 | 0.25 | 0.125 | 0.125 |

FIG.1A

CHANNEL BANDWIDTH AS A FUNCTION OF SUBCARRIER SPACING AND FFT SIZE

| SUBCARRIER SPACING [kHz] | 15 | 30 | 60 | 120 | 240 | |
|---|---|---|---|---|---|---|
| MAXIMUM BANDWIDTH 2k FFT(MHz) | 25 LTE | 50 | 100 | 200 | 400 | FFT SIZE USED ALREADY IN LTE |
| MAXIMUM BANDWIDTH 4k FFT(MHz) | 50 | 100 | 200 | 400 | 800 | RAN4: FEASIBLE FFT SIZE |
| MAXIMUM BANDWIDTH 8k FFT(MHz) | 100 | 200 | 400 | 800 | 1000 | RAN4: FEASIBLITY OF 8k FFT IS FFS |

COMBINATIONS WITH MARKINGS ARE OUTSIDE OF Rel-15

FIG.1B

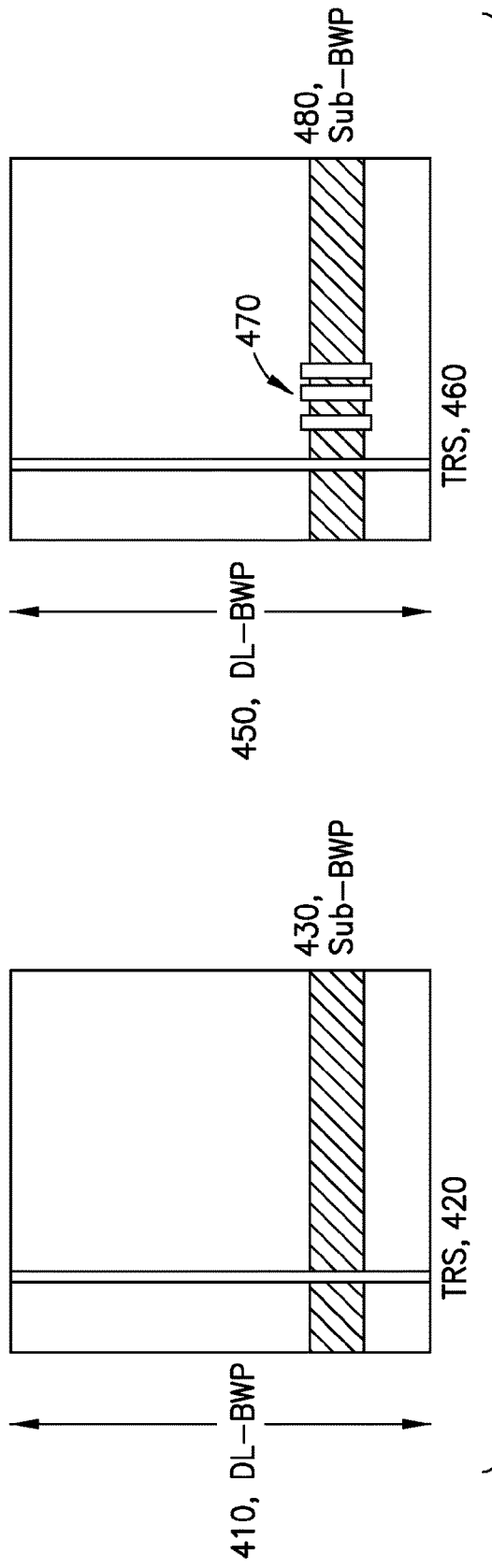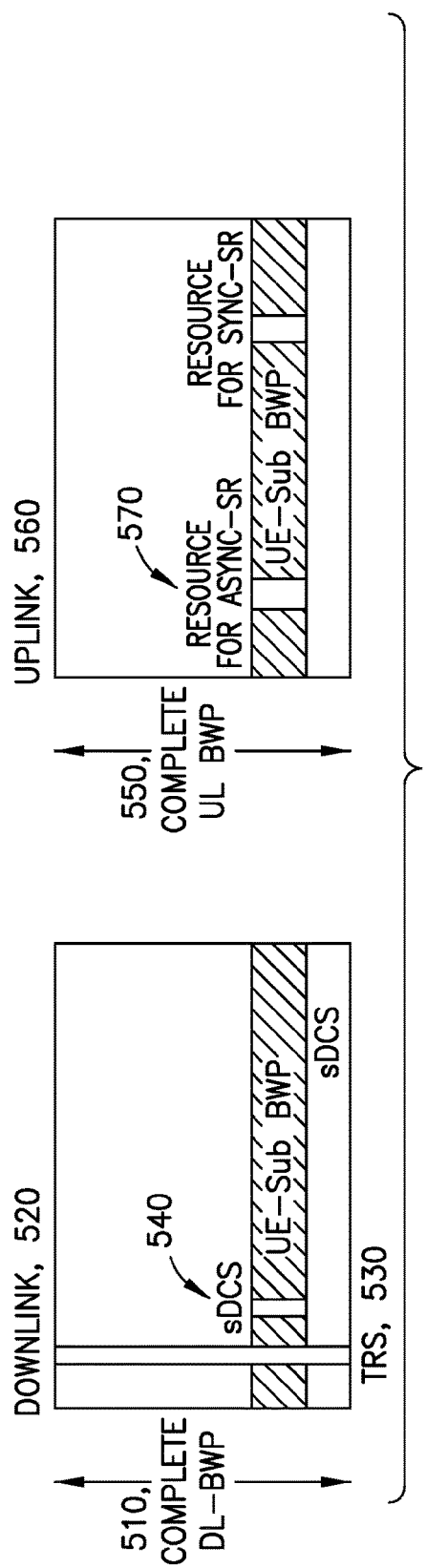
FIG.4
FIG.5

ENHANCEMENTS TO SUB-BWP OPERATION

CROSS REFERENCE TO RELATED APPLICATION

This patent application is a U.S. National Stage application of International Patent Application Number PCT/EP2020/054615 filed Feb. 21, 2020, which is hereby incorporated by reference in its entirety, and claims priority to IN 201941007196 filed Feb. 25, 2019.

TECHNICAL FIELD

The teachings in accordance with the exemplary embodiments of this invention relate generally to an $5^{th}$ generation (5G) radio system and, more specifically, relate to improved operations of a $5^{th}$ generation (5G) radio system focusing on machine type communication) and Internet of Things (IoT) technologies.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
BWP Bandwidth Part
CORESET Control Resource Set
DCI Downlink Control Information
DL Downlink
DMRS Demodulation Reference Signal
DRX Discontinuous Reception
eMTC Enhanced Machine Type Communications
FDM Frequency Division Multiplexing
FDMA Frequency Division Multiple Access
FFT Fast Fourier Transform
gNB 5G base station
IOT Internet of Things
LTE Long Term Evolution
MCS Modulation and Coding scheme
MIMO Multiple-Input Multiple-Output
MTC Machine Type Communications
MTD Machine Type Device
MU-MIMO Multi-User MIMO
NB-IoT Narrowband Internet of Things
NR New Radio
OCC Orthogonal Cover Code
OFDM Orthogonal FDM
OPEX Operating Expenditure
PBCH Physical Broadcast Channel
PCI Physical cell identity
PDCCH Physical Downlink Control Channel
PO Paging Occasion
PRACH Physical Random Access
PRB Physical Resource Block
PSS Primary Synchronization Signal
QoS Quality of Service
RAN4 3GPP RAN working group dealing with radio frequency aspects
Rel Release
RNTI Radio Network Temporal Identifier
SC-FDMA Single Carrier FDMA
SCS Subcarrier Spacing
SRS Sounding Reference Signal
SSB Synchronization Signal Block
SSS Secondary Synchronization Signal
SU-MIMO Single-User MIMO
TA Timing Advance
TRS Tracking Reference Signal
UE User Equipment
UL Uplink In next generation mobile communication system here have been efforts to develop and improve the communication system. The 5G communication system is generally implemented in higher frequency bands, e.g., to accomplish higher data rates. In addition, there is coordinated development with 5G of the Internet of things (IoT) where distributed entities, such as things, exchange and process information such as without human intervention.

Standards are continuing to progress to apply 5G communication systems to IoT networks, for implementing for example technologies such as sensor networks, MTC, and M2M communications. With these developments there is a need for improved communication of downlink control information in the next generation mobile communication system in accordance with recent advances.

Example embodiments of the invention at least work towards achieving these goals.

SUMMARY

In an example aspect of the invention, there is a method, such as may be performed by a user equipment side apparatus, comprising receiving, by a device, at least one control signal in one of subframes or symbols of a sub-bandwidth part of signaling from a network node of a communication network, wherein the sub-bandwidth part of the signaling is configured for the device; based on the at least one control signal of the sub-bandwidth part, performing timing and frequency synchronization for the communication network; and using the synchronized timing and frequency, performing communication operations with the communication network.

A further example embodiment is a method comprising the method of the previous paragraph, wherein the sub-bandwidth part has an associated bandwidth part, wherein physical resource blocks of the sub-bandwidth part are a sub-set of physical resource blocks occupied by the associated bandwidth part, wherein the at least one control signal of the sub-bandwidth part comprises at least one of a reference signal and a cell identifier, wherein the reference signal is a tracking reference signal, wherein the tracking reference signal is at least one of a periodic tracking reference signal covering the bandwidth of BWP, or an additional tracking reference signal associated to the paging occasion and covering the bandwidth of sub-bandwidth part, wherein the at least one control signal of the sub-bandwidth part is received based on periods of inactivity at the device, wherein the receiving comprises the device listening for the at least one reference signal on a preconfigured part of the associated bandwidth part for only 1 or 6 physical resource blocks, or 180 or 1080 kHz of spectrum, wherein the sub-bandwidth part is a specific part of a bandwidth part, and wherein the specific part of the bandwidth is predetermined by the device or configured by the communication network, wherein the one of subframes or symbols of the sub-bandwidth part of the signaling comprises a cell identifier, wherein the cell identity is for use by the device to detect limits of mobility for neighbor cells, wherein there is receiving, by the device, downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part, wherein the short information is conveyed in the sub-bandwidth part as at least one predefined sequence, wherein the one of subframes or symbols of the sub-bandwidth part of the signaling comprises a physical random access channel indicating a scheduling request for the device, wherein the indicated scheduling request of the sub-bandwidth part enables the device to trigger an uplink data transmission when a timing advance value is not valid, and wherein a narrowband CORESET is configured for the sub-bandwidth part, and wherein the one of subframes or symbols comprising the sub-bandwidth part are successive subframes or symbols.

In an example aspect of the invention, there is an apparatus, such as a user equipment side apparatus, comprising means for receiving, by a device, at least one control signal in one of subframes or symbols of a sub-bandwidth part of signaling from a network node of a communication network, wherein the sub-bandwidth part of the signaling is configured for the device; means, based on the at least one control signal of the sub-bandwidth part, for performing timing and frequency synchronization for the communication network; and means for using the synchronized timing and frequency, performing communication operations with the communication network.

A further example embodiment is an apparatus comprising the apparatus of the previous paragraph, wherein the sub-bandwidth part has an associated bandwidth part, wherein physical resource blocks of the sub-bandwidth part are a sub-set of physical resource blocks occupied by the associated bandwidth part, wherein the at least one control signal of the sub-bandwidth part comprises at least one of a reference signal and a cell identifier, wherein the reference signal is a tracking reference signal, where the tracking reference signal is at least one of a periodic tracking reference signal covering the bandwidth of BWP, or an additional tracking reference signal associated to the paging occasion and covering the bandwidth of sub-bandwidth part, where the at least one control signal of the sub-bandwidth part is received based on periods of inactivity at the device, wherein the receiving comprises the device listening for the at least one reference signal on a preconfigured part of the associated bandwidth part for only 6 physical resource blocks, wherein the sub-bandwidth part is a specific part of a bandwidth part, and wherein the specific part of the bandwidth is predetermined by the device or configured by the communication network, wherein the one of subframes or symbols of the sub-bandwidth part of the signaling comprises a cell identifier, wherein the cell identity is for use by the device to detect limits of mobility for neighbor cells, wherein there is means for receiving, by the device, downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part, wherein the short information is conveyed in the sub-bandwidth part as at least one predefined sequence, wherein the one of subframes or symbols of the sub-bandwidth part of the signaling comprises a physical random access channel indicating a scheduling request for the device, wherein the indicated scheduling request of the sub-bandwidth part enables the device to trigger an uplink data transmission when a timing advance value is not valid, and wherein a narrowband CORESET is configured for the sub-bandwidth part, and wherein the one of subframes or symbols comprising the sub-bandwidth part are successive subframes or symbols.

In an example aspect of the invention, there is an apparatus, such as a user equipment side apparatus, comprising at least one processor; and at least one memory including computer program code, where the at least one memory and the computer program code are configured, with the at least one processor, to cause the apparatus to at least: receive, by a device, at least one control signal in one of subframes or symbols of a sub-bandwidth part of signaling from a network node of a communication network, wherein the sub-bandwidth part of the signaling is configured for the device; based on the at least one control signal of the sub-bandwidth part, perform timing and frequency synchronization for the communication network; and use the synchronized timing and frequency, performing communication operations with the communication network.

A further example embodiment is an apparatus comprising the apparatus of the previous paragraph, wherein the sub-bandwidth part has an associated bandwidth part, wherein physical resource blocks of the sub-bandwidth part are a sub-set of physical resource blocks occupied by the associated bandwidth part, wherein the at least one control signal of the sub-bandwidth part comprises at least one of a reference signal and a cell identifier, wherein the reference signal is a tracking reference signal, where the tracking reference signal is at least one of a periodic tracking reference signal covering the bandwidth of BWP, or an additional tracking reference signal associated to the paging occasion and covering the bandwidth of sub-bandwidth part, where the at least one control signal of the sub-bandwidth part is received based on periods of inactivity at the device, wherein the receiving comprises the device listening for the at least one reference signal on a preconfigured part of the associated bandwidth part for only 6 physical resource blocks, wherein the sub-bandwidth part is a specific part of a bandwidth part, and wherein the specific part of the bandwidth is predetermined by the device or configured by the communication network, wherein the one of subframes or symbols of the sub-bandwidth part of the signaling comprises a cell identifier, wherein the cell identity is for use by the device to detect limits of mobility for neighbor cells, wherein the apparatus is caused to receive, by the device, downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part, wherein the short information is conveyed in the sub-bandwidth part as at least one predefined sequence, wherein the one of subframes or symbols of the sub-bandwidth part of the signaling comprises a physical random access channel indicating a scheduling request for the device, wherein the indicated scheduling request of the sub-bandwidth part enables the device to trigger an uplink data transmission when a timing advance value is not valid, and wherein a narrowband CORESET is configured for the sub-bandwidth part, and wherein the one of subframes or symbols comprising the sub-bandwidth part are successive subframes or symbols.

In another example aspect of the invention, there is a method, such as may be performed by a network side apparatus, comprising configuring, by a network node of a communication network, signaling comprising at least one control signal in one of subframes or symbols of a sub-bandwidth part of the signaling configured for a device, wherein the sub-bandwidth part of the signaling is configured for the device; and sending, by the network node, towards the device the signaling comprising the at least one control signal in the one of subframes or symbols of the sub-bandwidth part, wherein the at least one control signal of the sub-bandwidth part triggers timing and frequency synchronization at the device to enable communication operations with the communication network.

A further example embodiment is a method comprising the method of the previous paragraph, wherein the sub-bandwidth part has an associated bandwidth part, wherein physical resource blocks of the sub-bandwidth part are a sub-set of physical resource blocks occupied by the associated bandwidth part, wherein the at least one control signal of the sub-bandwidth part comprises at least one of a reference signal and a cell identifier, wherein the at least one reference signal is a tracking reference signal and the cell identifier is a short cell identifier, where the at least one control signal of the sub-bandwidth part is sent based on periods of inactivity at the device, wherein the at least one reference signal is on a preconfigured part of the associated bandwidth part for only 6 physical resource blocks, wherein the sub-bandwidth part is a specific part of a bandwidth part, and wherein the specific part of the bandwidth is predetermined at the device or configured by the communication network, wherein the one of subframes or symbols of the sub-bandwidth part of the signaling comprises a cell identifier, wherein the cell identity is for use by the device to detect limits of mobility for neighbor cells, wherein the configuring comprises including downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part, wherein the short information is conveyed in the sub-bandwidth part as at least one predefined sequence, wherein the one of subframes or symbols of the sub-bandwidth part of the signaling comprises a physical random access channel indicating a scheduling request for the device, and wherein the indicated scheduling request of the sub-bandwidth part is to enable the device to trigger an uplink data transmission when a timing advance value is not valid, wherein a narrowband CORESET is configured for the sub-bandwidth part, and wherein the one of subframes or symbols comprising the sub-bandwidth part are successive subframes or symbols.

In an example aspect of the invention, there is an apparatus, such as a network side apparatus, comprising means for configuring, by a network node of a communication network, signaling comprising at least one control signal in one of subframes or symbols of a sub-bandwidth part of the signaling configured for a device, wherein the sub-bandwidth part of the signaling is configured for the device; and means for sending, by the network node, towards the device the signaling comprising the at least one control signal in the one of subframes or symbols of the sub-bandwidth part, wherein the at least one control signal of the sub-bandwidth part triggers timing and frequency synchronization at the device to enable communication operations with the communication network.

A further example embodiment is an apparatus comprising the apparatus of the previous paragraph, wherein the sub-bandwidth part has an associated bandwidth part, wherein physical resource blocks of the sub-bandwidth part are a sub-set of physical resource blocks occupied by the associated bandwidth part, wherein the at least one control signal of the sub-bandwidth part comprises at least one of a reference signal and a cell identifier, wherein the at least one reference signal is a tracking reference signal and the cell identifier is a short cell identifier, wherein the at least one control signal of the sub-bandwidth part is sent based on periods of inactivity at the device, wherein the at least one reference signal is on a preconfigured part of the associated bandwidth part for only 6 physical resource blocks, wherein the sub-bandwidth part is a specific part of a bandwidth part, and wherein the specific part of the bandwidth is predetermined at the device or configured by the communication network, wherein the one of subframes or symbols of the sub-bandwidth part of the signaling comprises a cell identifier, wherein the cell identity is for use by the device to detect limits of mobility for neighbor cells, wherein the configuring comprises means for including downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part, wherein the short information is conveyed in the sub-bandwidth part as at least one predefined sequence, wherein the one of subframes or symbols of the sub-bandwidth part of the signaling comprises a physical random access channel indicating a scheduling request for the device, and wherein the indicated scheduling request of the sub-bandwidth part is to enable the device to trigger an uplink data transmission when a timing advance value is not valid, wherein a narrowband CORESET is configured for the sub-bandwidth part, and wherein the one of subframes or symbols comprising the sub-bandwidth part are successive subframes or symbols.

In an example aspect of the invention, there is an apparatus, such as network side apparatus, comprising at least one processor; and at least one memory including computer program code, where the at least one memory and the computer program code are configured, with the at least one processor, to cause the apparatus to at least: configure, by a network node of a communication network, signaling comprising at least one control signal in one of subframes or symbols of a sub-bandwidth part of the signaling configured for a device, wherein the sub-bandwidth part of the signaling is configured for the device; and send, by the network node, towards the device the signaling comprising the at least one control signal in the one of subframes or symbols of the sub-bandwidth part, wherein the at least one control signal of the sub-bandwidth part triggers timing and frequency synchronization at the device to enable communication operations with the communication network.

A further example embodiment is an apparatus comprising the apparatus of the previous paragraph, wherein the sub-bandwidth part has an associated bandwidth part, wherein physical resource blocks of the sub-bandwidth part are a sub-set of physical resource blocks occupied by the associated bandwidth part, wherein the at least one control signal of the sub-bandwidth part comprises at least one of a reference signal and a cell identifier, wherein the at least one reference signal is a tracking reference signal and the cell identifier is a short cell identifier, where the at least one control signal of the sub-bandwidth part is sent based on periods of inactivity at the device, wherein the at least one reference signal is on a preconfigured part of the associated bandwidth part for only 6 physical resource blocks, wherein the sub-bandwidth part is a specific part of a bandwidth part, and wherein the specific part of the bandwidth is predetermined at the device or configured by the communication network, wherein the one of subframes or symbols of the sub-bandwidth part of the signaling comprises a cell identifier, wherein the cell identity is for use by the device to detect limits of mobility for neighbor cells, wherein the configuring comprises including downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part, wherein the short information is conveyed in the sub-bandwidth part as at least one predefined sequence, wherein the one of subframes or symbols of the sub-bandwidth part of the signaling comprises a physical random access channel indicating a scheduling request for the device, and wherein the indicated scheduling request of the sub-bandwidth part is to enable the device to trigger an uplink data transmission when a timing advance value is not valid, wherein a narrowband CORESET is configured for the sub-bandwidth part, and wherein the one of subframes or symbols comprising the sub-bandwidth part are successive subframes or symbols.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 1A shows table 1 of available OFDM numerologies for 5G New Radio, Normal CP length (NR Phase I);

FIG. 1B shows Table 2 of channel bandwidth as a function of subcarrier spacing and FFT size;

FIG. 4 shows two scenarios in accordance with example embodiments of the invention related to RRC-INACTIVE state;

FIG. 5 shows Sub-BWP operation in accordance with an example embodiments of the invention;

DETAILED DESCRIPTION

Figure 2:
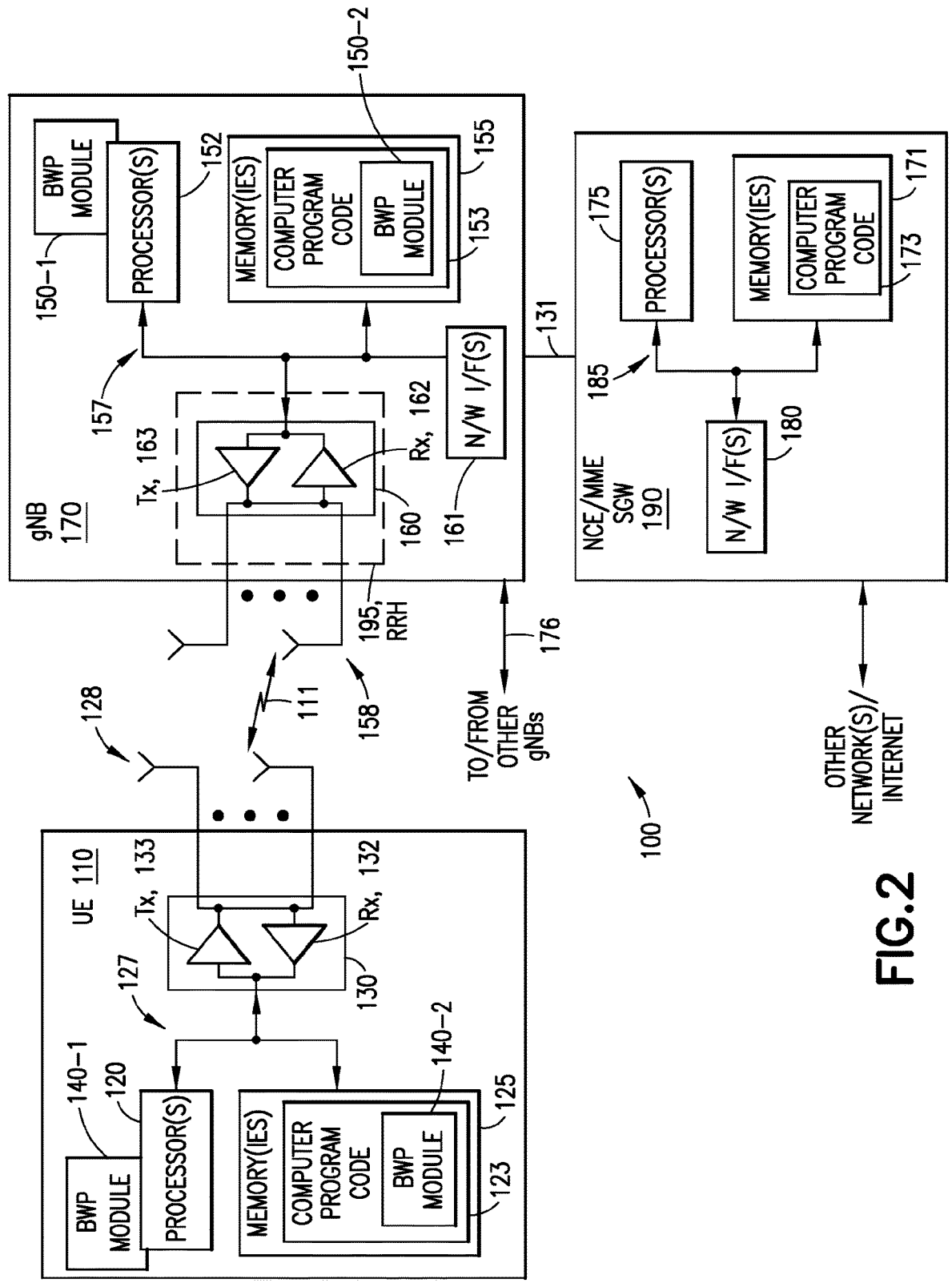
FIG. 2 shows a high level block diagram of various devices used in carrying out various aspects of the invention.

In this invention, we propose a design that will be improve operation of a $5^{th}$ generation (5G) radio system focusing on machine type communication.

Example embodiments of this invention relate to the Fifth Generation (5G) radio system, focusing especially on Machine Type Communication (MTC)/Internet of Things (IoT), and example embodiments of the invention can been seen as a general power efficiency improvement for various applications (such as smart phones) operating in specific scenarios. The machine-like terminals including e.g. supervision cameras, vending machines, smart meters, human sensors, internet type of things etc. are envisioned to create a lot of traffic for further cellular networks. The main requirements for MTC communications are low power consumptions and cheap price of devices. The requirement for low power consumption is typically more critical for MTC devices compared to typical mobile phone/smart phone. This is due to the fact that the battery of handset can be easily charged whereas this is not generally the case with MTC devices. For certain type of MTC devices, a life time in the order of one or more years is required even with a clock size battery. On the other hand, cheap price may require that MTC devices can have limited transceiver and receiver capabilities (compared to other devices).

Some main requirements of a 5G MTD (Machine Type Device) are that:

It can consume or generate any amount of data within a short time frame;

It may require millisecond level reaction time (or latency); and

It may also sleep for months and send a byte every now and then.

There are lots of MTC specific radio technologies like ZigBee, Bluetooth 4.0, Low power WiFi, 802.11ah and IEEE 802.15.4x already. However, cellular MTC has evident benefits like ubiquitous coverage & global connectivity, better QoS due to licensed spectrum and free (existing) signals available for synchronization. Example embodiments of the invention provide a novel cellular based MTC concept targeted to maximize battery life time and minimized overhead for cellular system. In the means of the invention, 5G is expected to become gradually the predominant radio access technology for diverse set of data applications.

NR Numerologies:

Regarding 5G NR numerology option, such options are shown in FIG. 1A. As shown in FIG. 1A there is identified for 5G NR subcarrier spacing of 15, 30, 60, 120, and 240 kHz a symbol duration in µ seconds, a nominal normal CP in µ seconds, a minimum scheduling interval in symbols, a minimum scheduling interval in slots, and a minimum scheduling interval in milliseconds. In FIG. 1A the circled NR numerology option combinations similar to LTE that as such is an implementation issue.

NR numerology options shown in Table 1 of FIG. 1A are based on subcarrier spacing of $15*2^N$ kHz.

15 kHz similar to LTE, good for wide area on traditional cellular bands;

30/60 kHz for dense-urban, lower latency and wider carrier BW;

60 kHz or higher needed for >10 GHz bands to combat phase noise.

RAN4 agreements for subcarrier spacing in Rel-15 is the following:

below 6 GHz: [15, 30, 60] kHz;

6 ... 52.6 GHz: [60, 120] kHz, 240 kHz can be considered if clear benefits are shown;

RAN4 agreements for minimum/maximum channel bandwidth in Rel-15 is the following:
below 6 GHz: 5 MHz/100 MHz,
6 ... 52.6 GHz: 50 MHz/400 MHz.

Table 2 of FIG. 1B shows the maximum channel bandwidth as a function of subcarrier spacing and the FFT size. As shown in Table 2 of FIG. 1B there is identified, for channel bandwidth as a function of subcarrier spacing of 15, 30, 60, 120, and 240 kHz and FFT size a maximum bandwidth and 2k FFT in MHz, a maximum bandwidth and 4k FFT in MHz, and a maximum bandwidth and 8k FFT in MHz. In FIG. 1B the circled FFT size (2k) is also as such an implementation issue, but it is typically used in various LTE scenarios. However, it can be noted that 4k FFT is needed to support a maximum channel BW (400 MHz) on particular band. Hence, it can be seen as a feasible FFT size for NR UEs.

Nb-IOT (Narrowband Internet of Things):
LTE supports NB-IOT (Narrowband Internet of Things) with the following design options:
Only FDD mode with normal CP length;
180 kHz UE RF bandwidth for both DL and uplink;
DL utilizes OFDMA with 15 kHz subcarrier spacing:
12 subcarriers are available in one NB-IOT carrier;
UL utilizes SC-FDMA and supports two options:
single tone transmission with 3.75 kHz SCS,
single tone transmission with 15 kHz SCS,
multi-tone (3, 6, 12) tone transmission with 15 kHz SCS;
Supports 3 different modes of operation: in-band, stand-alone, guard band.

Figure 3:
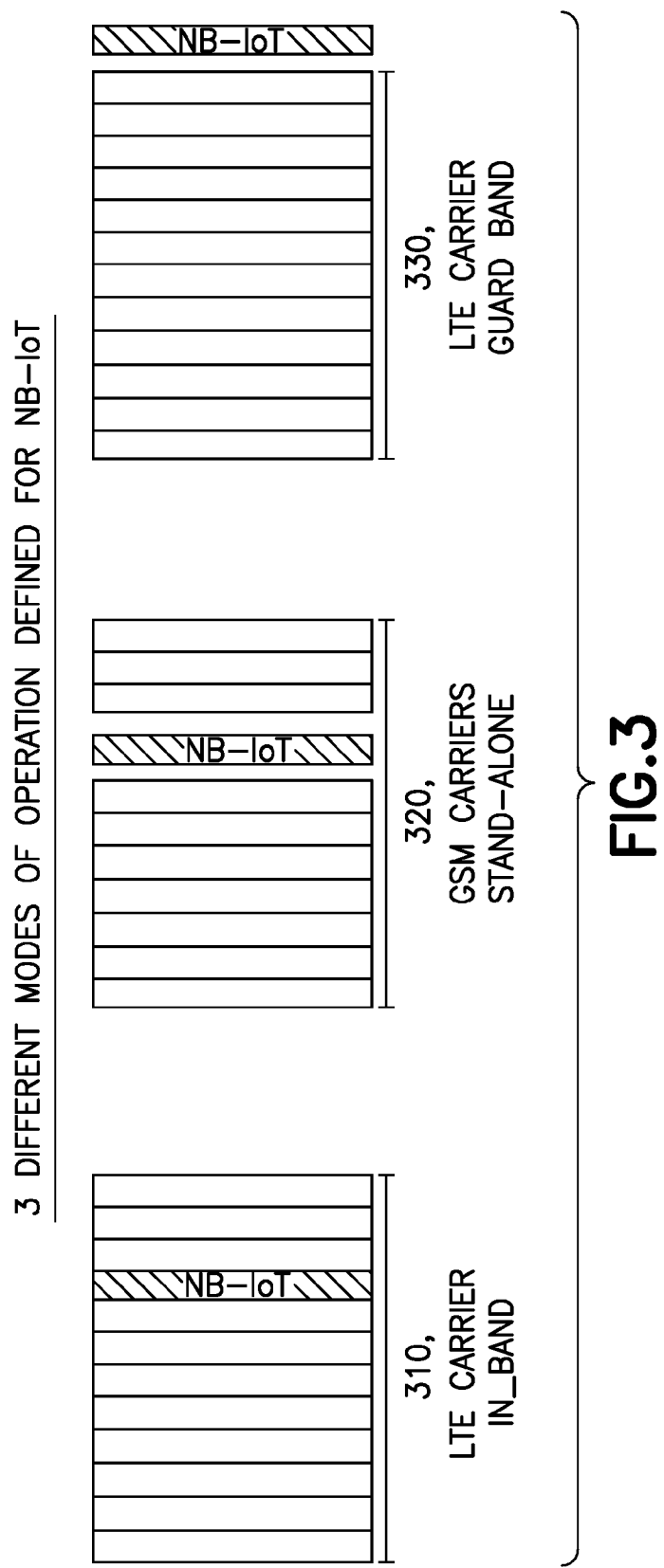
FIG. 3 shows different modes of operation for NB-IoT.

FIG. 3 shows 3 different modes of operation defined for NB-IoT. As shown in FIG. 3 there is an LTE carrier band 310 that is in-band, GSM carriers 320 that is stand-alone, and an LTE carrier 330 that is a guard band.

NR BWP Operation:

In Rel-15 NR, concept of serving cell adaptive BW was introduced by means of BWPs. In Rel-15 NR, UE is instructed to operate on a specific part of gNB's BW, that is, on a BWP. Up to 4 BWPs can be configured separately for UL and DL (this may be a subject to changes in the coming NR releases). The majority of RRC parameters in NR are configured on a BWP, each BWP can have e.g. separately configured subcarrier spacing (SCS), cyclic prefix, BW in terms of contiguous PRBs as well as location of the BW in the cell's total BW, K0, K1 and K2 values defining the time offsets from DL assignment reception to the beginning of PDSCH, from the end of PDSCH to HARQ-ACK transmission time, and from UL grant reception to the start of PUSCH transmission, respectively. In case of unpaired spectrum (i.e. TDD), UL and DL BWPs can be paired, in which case the centre frequency of both BWPs is required to be the same. One of the BWPs may be defined as default BWP e.g. to facilitate UE battery saving. In Rel-15 NR, UE may have only one BWP active at a time. Active BWP can be indicated by a field in the DCI or by RRC signalling. BWP switching occurs after UE has received the signalling changing the active BWP. UE may also fall-back to default BWP after a configured period of inactivity.

NR physical downlink control channel (NR-PDCCH) may be used to convey downlink control information (DCI). It utilizes OFDM waveform and polar coding. NR PDCCH may utilize every fourth resource element for demodulation reference signal (DMRS). DCI can be used for downlink (DL) and uplink (UL) resource allocation signaling. It may be used also for other purposes, such as carrier aggregation and bandwidth part (BWP) (de)activation, frame structure indication (with Group common PDCCH) and power control updates.

Monitoring of the control channel in NR that may be carried out by means of blind searches. Blind search or blind decoding may refer to the process by which a UE finds its PDCCH by monitoring a set of PDCCH candidates in every monitoring occasion. A monitoring occasion can be once a slot, once per multiple slots or multiple times in a slot. Physical downlink control channel (PDCCH) blind search may be arranged by means of parallel search space sets mapped to one or multiple control resource sets (CORE-SETs). During a PDCCH blind search, a UE may be monitoring predefined control channel elements (CCEs), aggregated CCEs and/or downlink control information (DCI) sizes with predefined RNTIs (Radio Network Temporal Index) in predefined time instants, corresponding to configured monitoring occasions.

CCEs may be arranged within a predefined CORESET configured via higher layer signalling. Each CCE may include 6 REGs, each REG consisting of 12 subcarriers within 1 OFDM symbol, and 1, 2 or 3 REG bundles. REG bundles may be arranged into the CORESET either according to interleaved or non-interleaved mapping. The UE may assume that REG bundle defines the precoder granularity in frequency and time used by gNB when transmitting PDCCH. CORESET resources may be configured in units of 6 resource blocks in the frequency.

REG bundle sizes options in terms of REGs are supported by new radio (NR). There is a linkage between a search space set and a CORESET. In Rel-15, the max number of CORESETs configurable for a bandwidth part (BWP) in a cell for a UE is 3 and the max number of search space sets configurable for a BWP in a cell for a UE is 10, respectively.

Example embodiments of the invention can enhance the basic sub-BWP operation proposed in accordance with embodiments of the Invention, and can result in improved power saving for NR IoT. In LTE, narrowband concept was introduced for eMTC and UE is configured to operate within the narrowband. A narrowband comprises of 6 PRBs and can be considered as a sub-BWP or BWP. Example embodiments of the invention can also enhance the basic narrowband operation proposed in accordance with embodiments of the Invention, and can result in improved power saving for eMTC as well.

Before describing the example embodiments of the invention in further detail reference is made to FIG. 2. FIG. 2 shows a block diagram of one possible and non-limiting exemplary system in which the exemplary embodiments may be practiced. In FIG. 2, a user equipment (UE) 110 is in wireless communication with a wireless network 100. A UE is a wireless, typically mobile device that can access a wireless network. The UE 110 includes one or more processors 120, one or more memory(ies) 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memory(ies) 125 include computer program code 123. The UE 110 may include a BWP module 140 which is configured to perform the example embodiments of the invention as described herein.

The BWP module 140 comprising one of or both parts 140-1 and/or 140-2, which may be implemented in a number of ways. The BWP module 140 may be implemented in hardware as BWP module 140-1, such as being implemented as part of the one or more processors 120. The BWP module 140-1 may be implemented also as an integrated circuit or through other hardware such as a programmable gate array. In another example, the BWP module 140 may be implemented as BWP module 140-2, which is implemented as computer program code 123 and is executed by the one or more processors 120. For instance, the one or more memory(ies) 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) can be network node such as a base station (e.g., for LTE, long term evolution) that provides access by wireless devices such as the UE 110 to the wireless network 100. The gNB 170 includes one or more processors 152, one or more memory(ies) 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memory(ies) 155 include computer program code 153. The gNB 170 includes a BWP module 150 which is configured to perform example embodiments of the invention as described herein. The BWP module 150 comprising one of or both parts 150-1 and/or 150-2, which may be implemented in a number of ways. The BWP module 150 may be implemented in hardware as BWP module 150-1, such as being implemented as part of the one or more processors 152. The BWP module 150-1 may be implemented also as an integrated circuit or through other hardware such as a programmable gate array. In another example, the BWP module 150 may be implemented as BWP module 150-2, which is implemented as computer program code 153 and is executed by the one or more processors 152. For instance, the one or more memory(ies) 155 and the computer program code 153 are configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The gNB 170 can include a device such as a relay node to implement example embodiments of the invention. The relay node can include an IAB (integrated access and backhaul) node to implement a DU (data unit) part. Further the one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

With regards to FIG. 2 the BWP modules are shown as specialized components for usage with operations in accordance with the example embodiments. These BWP modules may comprise at least integrated circuitry, processor circuitry, and/or memory circuitry incorporating computer program code for performing specific operations in accordance with example embodiments of the invention. However, it is noted that the inclusion of any of the BWP modules as stated above for FIG. 2 (e.g. 140-1, 140-2, 150-1, 150-2) are only optional. Although these specialized TSN modules may be beneficial to use, these BWP modules as shown in FIG. 2 are not required to be used to perform operations in accordance with example embodiments of the invention. It is submitted that any operations in accordance with the example embodiments of the invention can be performed using the other devices or components as shown in FIG. 2 when properly configured (e.g. memory(ies), computer program code, and processor(s)).

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memory(ies) 171, and one or more network interfaces (N/W I/F(s)) 180, interconnected through one or more buses 185. The one or more memory(ies) 171 include computer program code 173. The one or more memory(ies) 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memory(ies) 155 and 171, and also such virtualized entities create technical effects.

The computer readable memory(ies) 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memory(ies) 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

Operations in accordance with the example embodiments of the invention can include:

When UE enters into connected mode with configured BWP, the UE enters into sub-BWP operation where it listens to a reference signal e.g. TRS (tracking reference signal) on a preconfigured part of the BWP (for e.g. only 6 PRB);

To support the sub-BWP operation, a signal, such as TRS is transmitted on specific symbols with configured periodicity. Any UE in sub-BWP operation should be able to get timing and frequency corrections by listening to the part of TRS on its sub-BWP bandwidth;

UE is also configured with uplink sub-BWP part for transmission of SR (or PRACH, or other UL signal) when it wants to send uplink data;

The UE switches to full BWP (FBWP) after sending SR, and starts to monitor NR-PDCCH on complete bandwidth for resource allocation to proceed with uplink transmission; and gNB schedules DCI for this UE based on reception of SR on the UL-sub-BWP.

One basic solution in accordance with example embodiments of the invention enables the UE to operate with lesser RF bandwidth in connected mode when it does not have transmission in either uplink or downlink. The main purpose of the sub-BWP operation in connected mode is to maintain the downlink synchronisation based on part of TRS signal that falls within the sub-BWP. For NR UE, the UE may enter into RRC-INACTIVE state when there is inactivity is detected at UE or based on decision from gNB. When the UE enters into RRC-INACTIVE state, the gNB still maintains the UE context including security related information. The UE listens to only common channels and in case of NR, the UE listens to common CORESET for any incoming paging message but in DRX mode. The UE listens to common channels including synchronisation to SSB prior to its designated occasions when it expects downlink transmission from gNB. As per current specifications, the UE need to activate complete RF BW corresponds to SS-block and the common CORESET reception.

In accordance with example embodiments of the invention, for some NR-IoT devices, the UE can continue the sub-BWP operation in the last assigned BWP itself when it enters into RRC-INACTIVE state also. For this purpose, the TRS transmission needs to be modified to allow the UE to acquire required synchronisation prior to the paging occasion. With some changes to TRS signal, it is possible to allow limited mobility within sub-BWP operation itself among neighbouring cells.

Example embodiments of the invention include:

When UE enters into connected mode with configured BWP, the UE enters into sub-BWP operation where it listens to TRS on part of the BWP (for e.g. only 6 PRB);

To support the sub-BWP operation, a signal, such as TRS (tracking reference signal) is transmitted on specific symbols with configured periodicity. Any UE in sub-BWP operation should be able to maintain timing and frequency synchronizations based on the TRS on its sub-BWP bandwidth;

UE is also configured with uplink sub-BWP part for transmission of SR when it wants to send uplink data;

The UE switches to full BWP (FBWP) after sending SR, and starts to monitor NR-PDCCH on complete bandwidth for resource allocation to proceed with uplink transmission;

gNB schedules DCI for this UE based on reception of SR on the UL-sub-BWP.

Additional Transmission of TRS in Successive Subframes or Symbols to Support Network Synchronization for RRC-INACTIVE UE Depending on the period of DRX configurations and the size of the sub-BWP configured for the UE, the TRS signal is transmitted within a part of the BWP in more number of symbols and subframes prior to every paging occasion;

When the UE enters into RRC-INACTIVE state, UE is expected to monitor NR-PDCCH only during its paging occasion only. Prior to listening to NR-PDCCH, the UE need to synchronise to network using TRS. With additional TRS transmissions in the sub-BWP prior to paging occasion, the UE may be able to obtain required synchronisation prior to listening to NR-PDCCH;

The NR-PDCCH transmission may be preceded with SDCS (short downlink control signaling) to indicate paging (kind of wake-up-signal (WUS)) so that UE activate the full RF only if it detects the SDCS.

Short PCI Information Transmission on TRS

In order to enable detection mobility with immediate potential neighbours only, the TRS signal also carry additional information to identify the cell within neighbor-cells. In this case only limited number of cell specific sequences (N) may be required (for example up to 32 which is maximum neighbor list size) together with symbol-level orthogonal cover codes (OCCs). Detection of one out of N sequence within TRS of sub-BWP is less complex compared to detection out of 1000 PCI over TRS signal in short BW.

It is noted that the "information" or "short information" as referred to in this application can be used to refer to the same information. In accordance with example embodiments of the invention the term "short information" may be used in association with sub-BWP operations and/or a reduced form or "information" may be used in association with BWP operations.

Mobility Measurements and Cell Reselection Based on Short PCI

Via RRC signaling, the UE is informed about the short PCI and OCC associated with TRS of neighbor cells;

Via RRC signaling, the UE is also informed about uplink resource in each of the neighbor cells for triggering asynchronous SR in the new cell;

When the short PCI based measurements on serving cell indicates need to check for other cells, short PCI of configured neighbours are checked first and if found suitable UE switches to the sub-BWP of this neighbor directly;

On switching to new cell on sub-BWP, UE triggers SR from the uplink-sub-BWP to retrieve the common system information via dedicated RRC connection.

The realisation of the invention aspects for two scenarios related to RRC-INACTIVE state is explained here. The difference between TRS reception in RRC-CONNECTED and RRC-INACTIVE state is illustrated in FIG. 4. As shown in the downlink bandwidth part 410 of FIG. 4 there is a TRS 420 over a sub-BWP 430 in the downlink bandwidth part 410.

Scenario: UE in RRC-INACTIVE Mode with Sub-BWP Listening During Paging Occasions The steps associated with UE entering into RRC-INACTIVE state with sub-BWP mode is given below.

As part of transition to RRC-INACTIVE state higher layers informs the UE that, UE can continue on the current BWP along with sub-BWP listening;

Higher layer also provides information about additional transmissions of TRS for UE to synchronise prior to the paging occasion (PO);

Higher layer may provide the mapping of the TRS sequence ID and the OCC to the PCI. Alternatively, the mapping function may be predefined;

On entering into RRC-INACTIVE state, UE enters into light sleep mode without any downlink reception until its paging occasion as per DRX cycle. UE switches on the sub-BWP reception prior to PO (Paging Occasion) to listen to TRS for frequency and timing correction. After TRS reception, UE may optionally check for presence of short downlink-control signal to know the paging indication. If not configured, UE switches to full BWP after TRS reception for directly monitoring NR-PDCCH.

Scenario: UE in RRC-INACTIVE Mode Mobility Measurements Over Sub-BWP for Limited Mobility The steps associated with UE reselecting to new cell without switching to complete BWP in RRC-INACTIVE state are given below:

The gNB configures the potential neighbour-cells for sub-BWP mobility along with sequence number for C-TRS and OCC (can be called as short PCI);

gNB also provides the uplink resource information in each of these neighbour-cells for UE to trigger asynchronous scheduling request;

These configurations can be informed when UE enters into RRC-CONNECTED state or when leaving the RRC-CONNECTED state to RRC-INACTIVE state;

If the UE is configured to use sub-BWP signals for mobility measurements, UE checks the signal level of its current TRS sequence. If it goes below threshold value, UE checks for other possible neighbor cells based on checking against the configured short-PCI values;

If C-TRS for neighbouring cell is detected over sub-BWP, UE switches to new cell and trigger asynchronous scheduling request using sub-BWP to receive dedicated system information of the new cell using on-demand system information acquisition mechanism. The UE may then switch to the full BWP on the DL to receive the dedicated system information with reduced latency;

If none of the configured C-TRS is detected, the UE switches to detect SSB using full BWP for detecting other neighbour cells based on actual PCI value. The flow chart explaining the modified serving cell measurements using sub-BWP for mobility based on C-TRS using short PCI is illustrated in FIG. 6.

Figure 6:
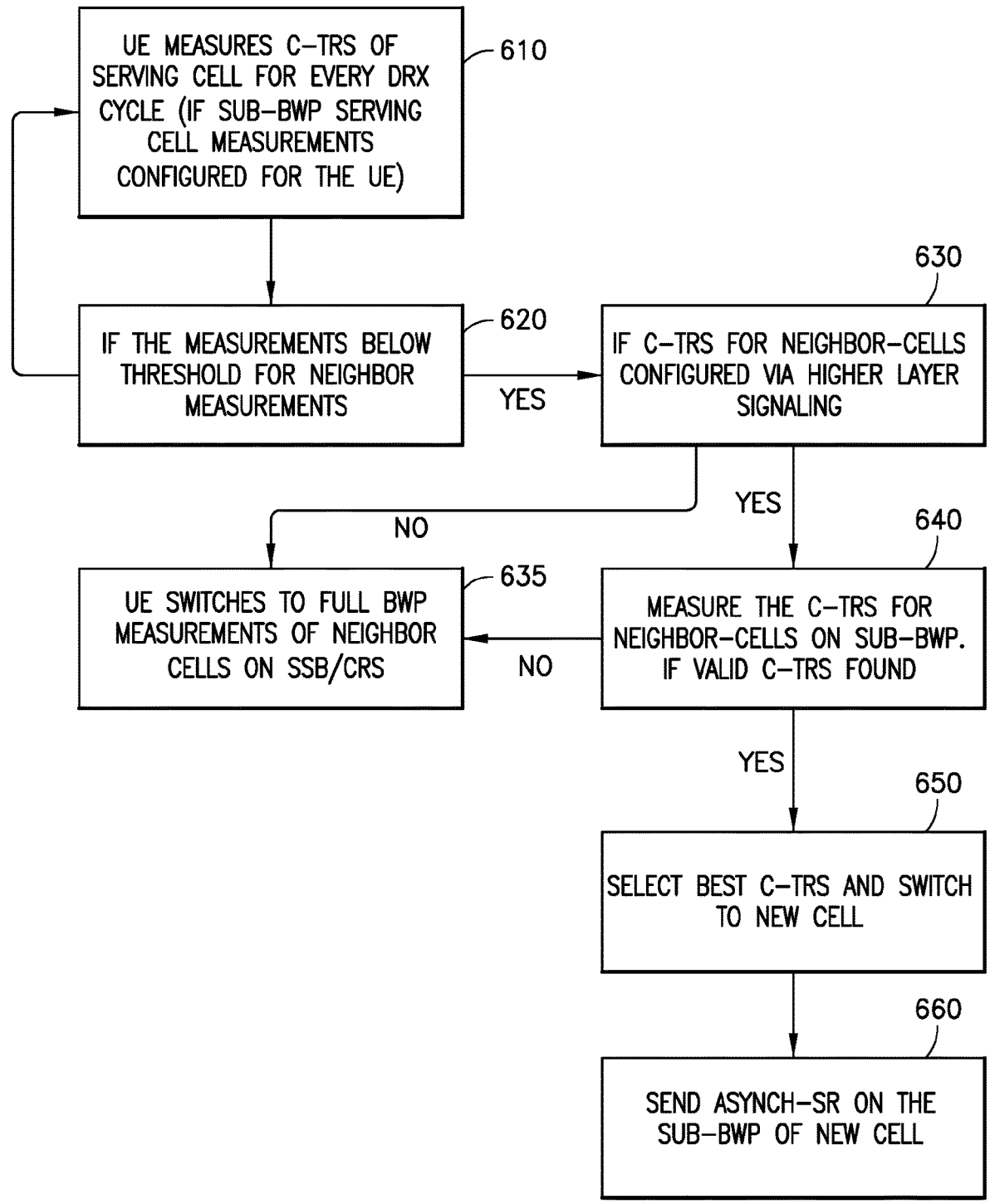
FIG. 6 shows a flow chart associated with modified serving cell measurements using sub-BWP for mobility based on C-TRS using short PCI in accordance with example embodiments of the invention.

As shown in step 610 of FIG. 6 the UE measures C-TRS of serving cell for every DRX cycle (if sub-BWP serving cell measurements are configured for the UE). As shown in step 620 of FIG. 6 there is determining if the measurements are below a threshold for neighbor measurements. At step 630 there is determining if C-TRS for neighbor cells are configured via higher layer signalling. If no in step 630 then as shown in step 635 the UE switches to full BWP measurement of neighbor cells on SSB/CRS. If yes in step 630 there is measuring the C-TRS for neighbor cells on sub-BWP if valid C-TRS found. If no valid C-TRS is found at step 640 then the operations return to step 635. If valid C-TRS is found at step 640 there is at step 650 of FIG. 6 selecting the best C-TRS and switching to a new cell. Then at step 660 of FIG. 6 there is sending asynch-SR on the sub-BWP of a new cell.

Short Downlink Control Signal on NR-PDCCH Symbols for DL Sub-BWP

On the few symbols reserved for NR-PDCCH, short downlink control signal (SDCS) is defined which can be mapped to these few symbols over the PRB corresponds to sub-BWP across one or more sub-frames. With extended time-domain mapping in sub-BWP operation, it is possible to configure new channel which carry few bits (e.g. 1-4 bits) to convey some short information to UE operating in sub-BWP.

The UE need not listen to SDCS in every slot instead the periodicity for this channel also can be configured as similar to TRS. SCDS may be configured separately from the signal facilitating (coarse) frequency/timing synchronization.

In one preferred embodiment, SDCS conveyed by mean of a predefined sequence, or sequences (such as CSIRS sequence).

In the case of 1-bit signaling:
DTX (i.e. no SCDS transmission) may indicate "no action for the UE";
SCDS transmission may indicate a predefined action such as "initiate RF retuning";
In the case of multiple bits, there can be multiple SCDS resources and/or multiple sequences. Another option is to use modulated sequence. These signaling states may be used for multiple purposes (as discussed below);
Multiple SDCSs can be FDM'ed within the BWP In another preferred embodiment, SDCS may be configured in a group-specific manner (in other words, common triggering for multiple UEs). Compared to dedicated configuration, this would create less DL overhead. On the other hand, it might create unnecessary "wake-up" for UEs without DL data transmission.

Single Tone PRACH with Hopping for Sending Asynchronous Scheduling Request

Single tone PRACH with hopping using 15 kHz SCS as similar to NB-IoT can be used. SCS of 15 kHz is used for the RACH based scheduling request as the timing advance variation is not expected to be large as that of cell radius here. So higher SCS can be used. Alternatively, the NR-PRACH design with higher SCS with shorter sequence can be used.

If the UE wants to trigger uplink data transmission when the timing advance value is not valid, the UE can trigger the new PRACH which will fit into the sub-BWP to indicate the scheduling request for the UE. gNB starts scheduling the DCI for this UE in downlink on reception of this signal. gNB can send the SDCS prior to transmission to acknowledge the reception of SR.

One sub-BWP operation along with new logical channels as proposed in accordance with example embodiments of the invention is illustrated in FIG. 5. As shown in FIG. 5 For a complete DL BWP 510 with a downlink 520 sDCS 540 is used as container for DL-related signals (depending on Use case) when operating according to sub-BWP based on TRS 530. Also as shown in FIG. 5 For a complete UL BWP 550 with an uplink 560 the Resource for async-SR 570 is used as container for DL-related signals (depending on Use case) when operating according to sub-BWP.

The Steps Involved in Switching from Sub-BWP to Full BWP for Different Triggers are Given Below:

Use-Case 1: Switching from Sub-BWP Based on Downlink Data

UE is configured with short-downlink-control-signal (or sub-BWP-PDCCH) when it enters into connected mode to specific BWP;

UE listens to TRS on the sub-BWP for downlink synchronization;

UE also listens to SDCS for any specific command as per the configured locations with sub-BWP;

When gNB receives downlink data, it sends the SDCS for the corresponding UE before scheduling the DCI for the UE over NR-PDCCH on Full-BWP;

UE switches its RF BW to full BWP and listens to NR-PDCCH once it detects corresponding command for it in the SDCS;

UE continues to monitor NR-PDCCH until it receives a command or indication from the gNB to switch back to the configured sub-BWP, after which it resumes listening to SDCS for commands.

Use-Case 2: Acknowledgement to SR in Sub-BWP

If the SDCS is configured to send acknowledgement for reception of SR at ENB, ENB will send Ack for SR in the SDCS signal.

If the UE is configured to wait for ACK prior to switching, UE listens to SDCS and then switches to full BWP.

The UE switches back to sub-BWP either when it has no more data in its buffer to transmit or when it receives a command or indication from the gNB to do so. This use-case is required, if more than one UE assigned to same SR resources or if the UE experience lose of SR in its earlier attempts for switching.

Use-Case 3: Uplink Transmission from UE After Expiry of Time-Alignment Timer

The Time alignment timer at UE expires;

UE switches to asynchronous Scheduling request operation;

UE receives data from application layer;

UE triggers the asynchronous scheduling request on the assigned PRACH resources within sub-BWP;

UE wait for acknowledgement via SDCS and then switches to full BWP by changing RF BW to Full-BWP;

The acknowledgement via SDCS to an asynchronous scheduling request also includes a Timing Advance (TA) command. Alternatively, a TA command MAC CE may also be sent;

UE adjusts its TA based on the command;

UE receives NR-PDCCH and sends the uplink data on PUSCH on the complete BWP;

The UE switches back to sub-BWP either when it has no more data in its buffer to transmit or when it receives a command or indication from the gNB to do so.

Use-Case 4: System Information/Configuration Related to Sub-BWP Changes

The resource configuration for sub-BWP and TRS periodicity are transmitted as part of system information;

When parameters related to sub-BWP changes, the UE monitoring sub-BWP will be communicated using the SDCS channel with 1 bit indication on the change;

UE on getting this indication, switches to Full BWP and reads the required system information via on demand system information mechanism via dedicated signaling;

This indication is only related to configurations of sub-BWP. Other system information changes, the UE need to identify when it switches to full BWP as part of data transmission.

Figure 7A:
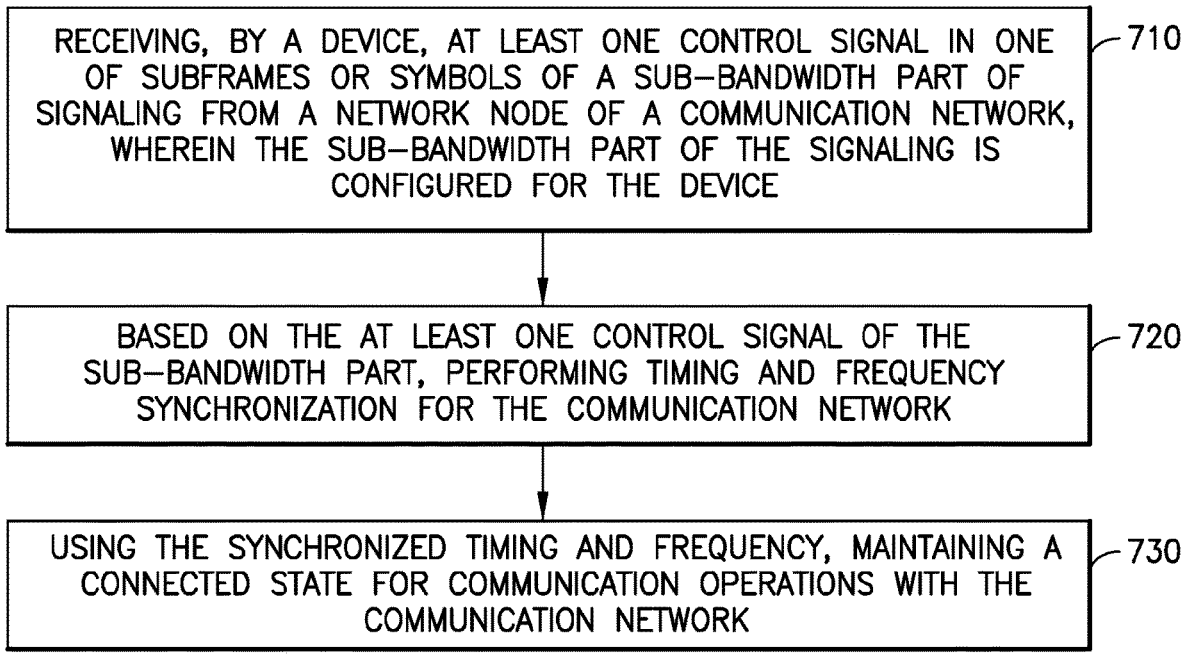
FIG. 7A and FIG. 7B each show a method in accordance with example embodiments of the invention which may be performed by an apparatus.

FIG. 7A illustrates operations which may be performed by a network device such as, but not limited to, a user equipment such as a UE 110 as in FIG. 2. As shown in step 710 of FIG. 7A there is receiving, by a device, at least one control signal in one of subframes or symbols of a sub-bandwidth part of signaling from a network node of a communication network, wherein the sub-bandwidth part of the signaling is configured for the device. As shown in step 720 of FIG. 7A there is, based on the at least one control signal of the sub-bandwidth part, performing timing and frequency synchronization for the communication network. Then at step 730 of FIG. 7A there is using the synchronized timing and frequency, maintain a connected state for communication operations with the communication network.

In accordance with example embodiments of the invention as disclosed in the paragraph above, wherein the sub-bandwidth part has an associated bandwidth part, wherein physical resource blocks of the sub-bandwidth part are a sub-set of physical resource blocks occupied by the associated bandwidth part.

In accordance with example embodiments of the invention as disclosed in the paragraphs above, wherein the at least one control signal of the sub-bandwidth part comprises at least one of a reference signal and a cell identifier.

In accordance with example embodiments of the invention as disclosed in the paragraphs above, wherein the reference signal is a tracking reference signal and the cell identifier is a short cell identifier.

In accordance with example embodiments of the invention as disclosed in the paragraphs above, where the at least one control signal of the sub-bandwidth part is received based on periods of inactivity at the device.

In accordance with example embodiments of the invention as disclosed in the paragraphs above, wherein the receiving comprises the device listening for the at least one reference signal on a preconfigured part of the associated bandwidth part for only 6 physical resource blocks.

In accordance with example embodiments of the invention as disclosed in the paragraphs above, wherein the sub-bandwidth part is a specific part of a bandwidth part, and wherein the specific part of the bandwidth is predetermined by the device or configured by the communication network.

In accordance with example embodiments of the invention as disclosed in the paragraphs above, wherein the one of subframes or symbols of the sub-bandwidth part of the signaling comprises a cell identifier, wherein the cell identity is for use by the device to detect limits of mobility for neighbor cells.

In accordance with example embodiments of the invention as disclosed in the paragraphs above, there is receiving, by the device, downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part.

In accordance with example embodiments of the invention as disclosed in the paragraphs above, wherein the short information is conveyed in the sub-bandwidth part as at least one predefined sequence.

In accordance with example embodiments of the invention as disclosed in the paragraphs above, wherein the one of subframes or symbols of the sub-bandwidth part of the signaling comprises a physical random access channel indicating a scheduling request for the device, and wherein indicated scheduling request of the sub-bandwidth part enables the device to trigger an uplink data transmission when a timing advance value is not valid.

In accordance with example embodiments of the invention as disclosed in the paragraphs above, wherein a narrowband CORESET is configured for the sub-bandwidth part.

In accordance with example embodiments of the invention as disclosed in the paragraphs above, wherein the one of subframes or symbols comprising the sub-bandwidth part are successive subframes or symbols.

A non-transitory computer-readable medium (Memory(ies) 125 as in FIG. 2) storing program code (Computer Program Code 123 and/or BWP Module 140-2 as in FIG. 2), the program code executed by at least one processor (Processor(s) 120 and/or BWP Module 140-1 as in FIG. 2) to perform the operations as at least described in the paragraphs above.

In accordance with an example embodiment of the invention as described above there is an apparatus comprising: means for receiving (one or more transceivers 130, Memory(ies) 125 storing program code Computer Program Code 123 and/or BWP Module 140-2 Processor(s) 120 and/or BWP Module 140-1 as in FIG. 2), by a device, (UE 110 as in FIG. 2), at least one control signal in one of subframes or symbols of a sub-bandwidth part of signaling from a network node of a communication network, wherein the sub-bandwidth part of the signaling is configured for the device. Means, based on the at least one control signal of the sub-bandwidth part, for performing (Memory(ies) 125 storing program code Computer Program Code 123 and/or BWP Module 140-2 Processor(s) 120 and/or BWP Module 140-1 as in FIG. 2) timing and frequency synchronization for the communication network. Then, means for using (Memory(ies) 125 storing program code Computer Program Code 123 and/or BWP Module 140-2 Processor(s) 120 and/or BWP Module 140-1 as in FIG. 2) the synchronized timing and frequency, maintain a connected state for communication operations with the communication network.

In the example aspect of the invention according to the paragraph above, wherein at least the means for receiving, performing, and using comprises a non-transitory computer readable medium [Memory(ies) 125 as in FIG. 2] encoded with a computer program [Computer Program Code 123 and/or BWP Module 140-2 as in FIG. 2] executable by at least one processor [Processor(s) 120 and/or BWP Module 140-1 as in FIG. 2].

Figure 7B:
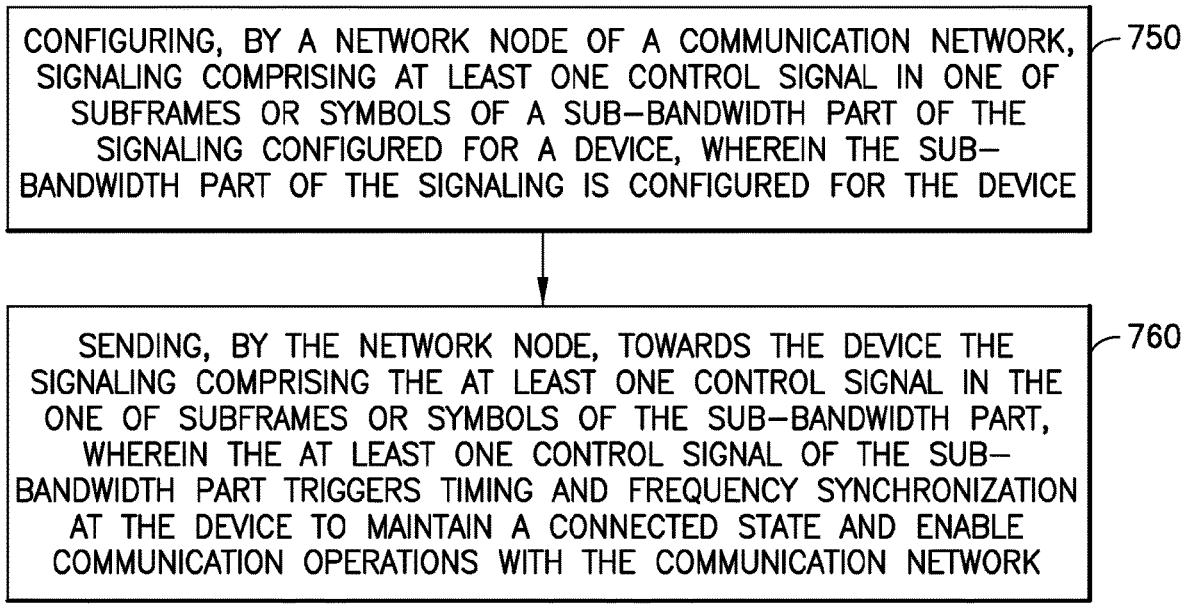

FIG. 7B illustrates operations which may be performed by a network device such as, but not limited to, a network node such as a gNB 170 as in FIG. 2. As shown in step 750 of FIG. 7B configuring, by a network node of a communication network, signaling comprising at least one control signal in one of subframes or symbols of a sub-bandwidth part of the signaling configured for a device, wherein the sub-bandwidth part of the signaling is configured for the device. Then as shown in step 760 of FIG. 7B there is sending, by the network node, towards the device the signaling comprising the at least one control signal in the one of subframes or symbols of the sub-bandwidth part, wherein the at least one control signal of the sub-bandwidth part triggers timing and frequency synchronization at the device to maintain a connected state to enable communication operations with the communication network.

In accordance with example embodiments of the invention as disclosed in the paragraph above, wherein the sub-bandwidth part has an associated bandwidth part, wherein physical resource blocks of the sub-bandwidth part are a sub-set of physical resource blocks occupied by the associated bandwidth part.

In accordance with example embodiments of the invention as disclosed in the paragraphs above, wherein the at least one control signal of the sub-bandwidth part comprises at least one of a reference signal and a cell identifier.

In accordance with example embodiments of the invention as disclosed in the paragraphs above, wherein the at least one reference signal is a tracking reference signal and the cell identifier is a short cell identifier.

In accordance with example embodiments of the invention as disclosed in the paragraphs above, wherein the at least one control signal of the sub-bandwidth part is sent based on periods of inactivity at the device.

In accordance with example embodiments of the invention as disclosed in the paragraphs above, wherein the at least one reference signal is on a preconfigured part of the associated bandwidth part for only 6 physical resource blocks.

In accordance with example embodiments of the invention as disclosed in the paragraphs above, wherein the sub-bandwidth part is a specific part of a bandwidth part, and wherein the specific part of the bandwidth is predetermined at the device or configured by the communication network.

In accordance with example embodiments of the invention as disclosed in the paragraphs above, wherein the one of subframes or symbols of the sub-bandwidth part of the signaling comprises a cell identifier, wherein the cell identity is for use by the device to detect limits of mobility for neighbor cells.

In accordance with example embodiments of the invention as disclosed in the paragraphs above, wherein the configuring comprises including downlink control signaling in the one of subframes or symbols of the sub-bandwidth part, wherein the downlink control signaling conveys short information associated with at least one of a downlink data scheduling operation, a uplink data scheduling operation, a scheduling request acknowledgement, or a system information update regarding a bandwidth part.

In accordance with example embodiments of the invention as disclosed in the paragraphs above, wherein the short information is conveyed in the sub-bandwidth part as at least one predefined sequence.

In accordance with example embodiments of the invention as disclosed in the paragraphs above, wherein the one of subframes or symbols of the sub-bandwidth part of the signaling comprises a physical random access channel indicating a scheduling request for the device, and wherein the indicated scheduling request of the sub-bandwidth part is to enable the device to trigger an uplink data transmission when a timing advance value is not valid.

In accordance with example embodiments of the invention as disclosed in the paragraphs above, wherein a narrowband CORESET is configured for the sub-bandwidth part.

In accordance with example embodiments of the invention as disclosed in the paragraphs above, wherein the one of subframes or symbols comprising the sub-bandwidth part are successive subframes or symbols.

A non-transitory computer-readable medium (Memory(ies) 155 as in FIG. 2) storing program code (Computer Program Code 153 and/or BWP Module 150-2 as in FIG. 2), the program code executed by at least one processor (Processor(s) 152 and/or BWP Module 150-1 as in FIG. 2) to perform the operations as at least described in the paragraphs above.

In accordance with an example embodiment of the invention as described above there is an apparatus comprising: means for configuring (Memory(ies) 155 storing program code Computer Program Code 153 and/or BWP Module 150-2, Processor(s) 152 and/or BWP Module 150-1 as in FIG. 2), by a network node (gNB 170 as in FIG. 2) of a communication network (network 100 as in FIG. 2), signaling comprising at least one control signal in one of subframes or symbols of a sub-bandwidth part of the signaling configured for a device, wherein the sub-bandwidth part of the signaling is configured for the device. Then means for sending (one or more antennas 158, Memory(ies) 155 storing program code Computer Program Code 153 and/or BWP Module 150-2, Processor(s) 152 and/or BWP Module 150-1 as in FIG. 2), by the network node, towards the device the signaling comprising the at least one control signal in the one of subframes or symbols of the sub-bandwidth part, wherein the at least one control signal of the sub-bandwidth part triggers timing and frequency synchronization at the device to maintain a connected state to enable communication operations with the communication network.

In the example aspect of the invention according to the paragraph above, wherein at least the means for configuring and sending comprises a non-transitory computer readable medium [Memory(ies) 155 as in FIG. 2] encoded with a computer program [Computer Program Code 153 and/or BWP Module 150-2 as in FIG. 2] executable by at least one processor [Processor(s) 152 and/or BWP Module 150-1 as in FIG. 2].

Some improved operational features in accordance with example embodiments of the invention as discussed herein include:

Downlink signal/Logical channel operating over a few OFDM symbols spanning across one or more subframes to inform short or compact or a subset of information for UE operating in sub-BWP;
  The short information consists of
    Downlink data arrival
    Acknowledgement of Scheduling Request.
    Possible system information change regarding sub-BWP.
  PRACH signal fits within sub-BWP with higher subcarrier spacing sufficient to cover the timing drift within connected mode for triggering asynchronous scheduling request;
  Additional transmissions of TRS part depending on the DRX configuration of the cell to enable use of TRS for frequency and timing synchronisation prior to PO in RRC-INACTIVE state. The additional transmission of TRS is configured for only specific part of BWP instead of repeating the TRS itself for more times. When the UE enters into RRC-INACTIVE state it knowns the sub-BWP to check for TRS prior to its downlink monitoring occasion in RRC-INACTIVE. This sub-BWP known as "sub-BWP-RRC-INACTIVE" is also configured by higher layer signaling;
  Inclusion of short cell identifier to detect limited mobility within cluster of neighboring cells in TRS;
  Higher layer signaling for configuration of resource for asynchronous SR transmission in new cell after cell reselection;
  Improved UE power saving together with reduced latency for DL initiated data reception;
  SCDS has small overhead;
  SCDS has low detection complexity at the UE;
  Compatible with NR BWP operation;
  The proposed approach can be used not only for IoT/MTC terminals, but they can be used also by normal UEs.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
  receiving, by a device operating in an RRC-INACTIVE state and configured with sub-bandwidth part listening, at least one control signal in one of subframes or symbols of the sub-bandwidth part of signaling with configured periodicity from a network node of a communication network, said at least one control signal of the sub-bandwidth part comprises a tracking reference signal (TRS) which further comprises an additional TRS transmission associated to a paging occasion and covering a bandwidth of the sub-bandwidth part indicating the device to activate a full bandwidth part upon detecting the at least one control signal, and as a part of transition to the RRC-INACTIVE state along with the sub-bandwidth part listening higher layers inform the device to continue on a current bandwidth part, provide information about the additional TRS transmission for the device to perform timing and frequency synchronization prior to the paging occasion and also provide mapping of TRS sequence identifier and Orthogonal Cover Code (OCC) to physical cell identifier (PCI), wherein the sub-bandwidth part of the signaling is configured for the device;

based on the at least one control signal of the sub-bandwidth part, performing the timing and frequency synchronization for the communication network based on the TRS on the sub-bandwidth part bandwidth; and using the synchronized timing and frequency, maintain a connected state for communication operations with the communication network by configuring the device to use the sub-bandwidth part signals for mobility measurements and for reselection of a new cell without switching to the full bandwidth part in the RRC-INACTIVE state, said mobility measurements and reselection comprise checking a signal level of a current TRS (C-TRS) sequence, and upon detecting the C-TRS sequence below a threshold value, checking for other possible neighbor cells by using short PCI values, wherein gNB (5G base station) configures the neighbor cells for sub-bandwidth part mobility and the short PCI values.

2. A non-transitory computer readable medium including computer program code configured to cause an apparatus to perform at least the method of claim 1.

3. A method, comprising:

configuring, by a network node of a communication network, signaling comprising at least one control signal in one of subframes or symbols of a sub-bandwidth part of the signaling with configured periodicity configured for a device operating in an RRC-INACTIVE state and configured with sub-bandwidth part listening, said at least one control signal of the sub-bandwidth part comprises a tracking reference signal (TRS) which further comprises an additional TRS transmission associated to a paging occasion and covering a bandwidth of sub-bandwidth part indicating the device to activate a full bandwidth part upon detecting the at least one control signal, and as a part of transition to the RRC-INACTIVE state along with the sub-bandwidth part listening higher layers inform the device to continue on a current bandwidth part, provide information about the additional TRS transmission for the device to perform timing and frequency synchronization prior to the paging occasion and also provide mapping of TRS sequence identifier and Orthogonal Cover Code (OCC) to physical cell identifier (PCI), wherein the sub-bandwidth part of the signaling is configured for the device; and sending, by the network node, towards the device the signaling comprising the at least one control signal in the one of subframes or symbols of the sub-bandwidth part, wherein the at least one control signal of the sub-bandwidth part triggers the timing and frequency synchronization at the device to maintain a connected state to enable communication operations with the communication network by configuring the device to use the sub-bandwidth part signals for mobility measurements and for reselection of a new cell without switching to the full bandwidth part in the RRC-INACTIVE state, said mobility measurements and reselection comprise checking a signal level of current TRS (C-TRS) sequence, and upon detecting the C-TRS sequence below a threshold value, checking for other possible neighbor cells by using short PCI values, wherein gNB (5G base station) configures the neighbor cells for sub-bandwidth part mobility and the short PCI values.

4. A non-transitory computer readable medium including computer program code configured to cause an apparatus to perform at least the method of claim 3.

5. An apparatus, comprising:

at least one processor; and at least one non-transitory memory including computer program code, where the at least one memory and the computer program code are configured, with the at least one processor, to cause the apparatus to at least:

receive, by a device operating in an RRC-INACTIVE state and configured with sub-bandwidth part listening, at least one control signal in one of subframes or symbols of the sub-bandwidth part of signaling with configured periodicity from a network node of a communication network, said at least one control signal of the sub-bandwidth part comprises a tracking reference signal (TRS) which further comprises an additional TRS transmission associated to a paging occasion and covering a bandwidth of the sub-bandwidth part indicating the device to activate a full bandwidth part upon detecting the at least one control signal, and as a part of transition to the RRC-INACTIVE state along with the sub-bandwidth part listening higher layers inform the device to continue on a current bandwidth part, provide information about the additional TRS transmission for the device to perform timing and frequency synchronization prior to the paging occasion and also provide mapping of TRS sequence identifier and Orthogonal Cover Code (OCC) to physical cell identifier (PCI), wherein the sub-bandwidth part of the signaling is configured for the device;

based on the at least one control signal of the sub-bandwidth part, perform the timing and frequency synchronization for the communication network; and use the synchronized timing and frequency for maintaining a connected state for communication operations with the communication network by configuring the device to use the sub-bandwidth part signals for mobility measurements and for reselection of a new cell without switching to the full bandwidth part in the RRC-INACTIVE state, said mobility measurements and reselection comprise checking signal level of current TRS (C-TRS) sequence, and upon detecting the C-TRS sequence below a threshold value, checking for other possible neighbor cells by using short PCI values, wherein gNB (5G base station) configures the neighbor cells for sub-bandwidth part mobility and the short PCI values.

6. The apparatus of claim 5, wherein the sub-bandwidth part has an associated bandwidth part, wherein physical resource blocks of the sub-bandwidth part are a sub-set of physical resource blocks occupied by the associated bandwidth part.

7. The apparatus of claim 6, where the at least one control signal of the sub-bandwidth part is received based on periods of inactivity at the device.

8. The apparatus of claim 7, comprising circuitry configured for the device operating in the RRC-INACTIVE state and configured with the sub-bandwidth part listening for the at least one TRS on a preconfigured part of the associated bandwidth part for only 6 physical resource blocks.

9. The apparatus of claim 5, wherein the sub-bandwidth part is a specific part of a bandwidth part, and wherein the specific part of the bandwidth is predetermined by the device or configured by the communication network.

10. The apparatus of claim 5, wherein the PCI is for use by the device to detect limits of mobility for the neighbor cells.

11. The apparatus of claim 5, comprising:
circuitry configured for receiving, by the device, downlink control signaling in the one of subframes or symbols of the sub-bandwidth part, wherein the downlink control signaling conveys short information associated with at least one of:
a downlink data scheduling operation,
a uplink data scheduling operation,
a scheduling request acknowledgement, or
a system information update regarding a bandwidth part.

12. The apparatus of claim 11, wherein the short information is conveyed in the sub-bandwidth part as at least one predefined sequence.

13. The apparatus of claim 5, wherein the one of subframes or symbols of the sub-bandwidth part of the signaling comprises a physical random access channel indicating a scheduling request for the device, and wherein the indicated scheduling request of the sub-bandwidth part enables the device to trigger an uplink data transmission when a timing advance value is not valid, wherein the device switches to the full bandwidth part after sending the scheduling request, and starts to monitor a new radio physical downlink control channel (NR-PDCCH) on complete bandwidth for resource allocation to proceed with the uplink data transmission and the gNB schedules downlink control information (DCI) for the device based on reception of the scheduling request on an uplink sub-bandwidth part.

14. The apparatus of claim 13, wherein a narrowband Control Resource Set (CORESET) is configured for the sub-bandwidth part and when the device is operating in the RRC-INACTIVE state, the gNB maintains device context including security related information and the device listens to the narrowband CORESET for any incoming paging message but in discontinuous reception (DRX) mode.

15. The apparatus of claim 5, wherein upon detecting the C-TRS for the neighbor cell over the sub-bandwidth part, the device switches to the new cell and triggers an asynchronous scheduling request using the sub-bandwidth part to receive dedicated system information of the new cell using an on-demand system information acquisition mechanism, wherein the device switches to the full bandwidth part on downlink to receive the dedicated system information with reduced latency.

16. The apparatus of claim 5, wherein upon detecting that C-TRS configured for none of the neighbor cells is detected, the device switches to detect Synchronization Signal Block (SSB) using the full bandwidth part for detecting the other possible neighbor cells based on actual PCI value.

17. An apparatus, comprising:
at least one processor; and
at least one non-transitory memory including computer program code, where the at least one memory and the computer program code are configured, with the at least one processor, to cause the apparatus to at least:
configure, by a network node of a communication network, signaling comprising at least one control signal in one of subframes or symbols of a sub-bandwidth part of the signaling with configured periodicity configured for a device operating in an RRC-INACTIVE state and configured with sub-bandwidth part listening, said at least one control signal of the sub-bandwidth part comprises a tracking reference signal (TRS) which further comprises an additional TRS transmission associated to a paging occasion and covering a bandwidth of sub-bandwidth part indicating the device to activate a full bandwidth part upon detecting the at least one control signal, and as a part of transition to the RRC-INACTIVE state along with the sub-bandwidth part listening higher layers inform the device to continue on a current bandwidth part, provide information about the additional TRS transmission for the device to perform timing and frequency synchronization prior to the paging occasion and also provide mapping of TRS sequence identifier and Orthogonal Cover Code (OCC) to physical cell identifier (PCI), wherein the sub-bandwidth part of the signaling is configured for the device; and
send, by the network node, towards the device the signaling comprising the at least one control signal in the one of subframes or symbols of the sub-bandwidth part, wherein the at least one control signal of the sub-bandwidth part triggers the timing and frequency synchronization at the device to enable communication operations with the communication network by configuring the device to use the sub-bandwidth part signals for mobility measurements and for reselection of a new cell without switching to the full bandwidth part in the RRC-INACTIVE state, said mobility measurements and reselection comprise checking signal level of current TRS (C-TRS) sequence, and upon detecting the C-TRS sequence below a threshold value, checking for other possible neighbor cells by using short PCI values, wherein gNB (5G base station) configures the neighbor cells for sub-bandwidth part mobility and the short PCI values.

18. The apparatus of claim 17, wherein the sub-bandwidth part has an associated bandwidth part, wherein physical resource blocks of the sub-bandwidth part are a sub-set of physical resource blocks occupied by the associated bandwidth part.

19. The apparatus of claim 18, where the at least one control signal of the sub-bandwidth part is sent based on periods of inactivity at the device.

20. The apparatus of claim 19, wherein the at least one TRS is on a preconfigured part of the associated bandwidth part for only 6 physical resource blocks for the device operating in the RRC-INACTIVE state and configured with the sub-bandwidth part listening.

21. The apparatus of claim 17, wherein the sub-bandwidth part is a specific part of a bandwidth part, and wherein the specific part is predetermined at the device or configured by the communication network.

22. The apparatus of claim 17, wherein the PCI is for use by the device to detect limits of mobility for the neighbor cells.

23. The apparatus of claim 17, comprising circuitry configured for including downlink control signaling in the one of subframes or symbols of the sub-bandwidth part, wherein the downlink control signaling conveys short information associated with at least one of:

a downlink data scheduling operation, a uplink data scheduling operation, a scheduling request acknowledgement, or a system information update regarding a bandwidth part.

24. The apparatus of claim 23, wherein the short information is conveyed in the sub-bandwidth part as at least one predefined sequence.

25. The apparatus of claim 17, wherein the one of subframes or symbols of the sub-bandwidth part of the signaling comprises a physical random access channel indicating a scheduling request for the device, and wherein the indicated scheduling request of the sub-bandwidth part is to enable the device to trigger an uplink data transmission when a timing advance value is not valid, wherein the device switches to the full bandwidth part after sending the scheduling request, and starts to monitor a new radio physical downlink control channel (NR-PDCCH) on complete bandwidth for resource allocation to proceed with the uplink data transmission and the gNB schedules downlink control information (DCI) for the device based on reception of the scheduling request on an uplink sub-bandwidth part.

26. The apparatus of claim 25, wherein a narrowband Control Resource Set (CORESET) is configured for the sub-bandwidth part and when the device is operating in the RRC-INACTIVE state, the gNB maintains device context including security related information and the device listens to the narrowband CORESET for any incoming paging message but in discontinuous reception (DRX) mode.

27. The apparatus of claim 17, wherein the one of subframes or symbols comprising the sub-bandwidth part are successive subframes or symbols.

* * * * *